(12) United States Patent
Shapiro et al.

(10) Patent No.: US 11,196,063 B2
(45) Date of Patent: Dec. 7, 2021

(54) SYSTEM AND METHOD FOR SOLID OXIDE FUEL CELLS WITH STAGED FUEL SUPPLY

(71) Applicant: CUMMINS ENTERPRISE LLC, Indianapolis, IN (US)

(72) Inventors: Andrew Philip Shapiro, Malta, NY (US); Darren Bawden Hickey, Halfmoon, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 296 days.

(21) Appl. No.: 16/492,452

(22) PCT Filed: Mar. 28, 2018

(86) PCT No.: PCT/US2018/024743
§ 371 (c)(1),
(2) Date: Sep. 9, 2019

(87) PCT Pub. No.: WO2018/183433
PCT Pub. Date: Oct. 4, 2018

(65) Prior Publication Data
US 2021/0043952 A1  Feb. 11, 2021

Related U.S. Application Data

(63) Continuation of application No. 15/471,716, filed on Mar. 28, 2017, now Pat. No. 10,355,294.

(51) Int. Cl.
*H01M 8/04082* (2016.01)
*H01M 8/04014* (2016.01)
(Continued)

(52) U.S. Cl.
CPC ....... *H01M 8/04201* (2013.01); *H01M 8/026* (2013.01); *H01M 8/0254* (2013.01);
(Continued)

(58) Field of Classification Search
CPC ............... H01M 8/0254; H01M 8/026; H01M 8/04014; H01M 8/04201; H01M 8/0637;
(Continued)

(56) References Cited

U.S. PATENT DOCUMENTS 6,296,964 B1 * 10/2001 Ren .................... H01M 8/04
429/431
6,896,992 B2  5/2005 Kearl
(Continued)

FOREIGN PATENT DOCUMENTS

CN    102088100 A    6/2011
DE    102004058117   6/2006
(Continued)

OTHER PUBLICATIONS

PCT Search Report and Written Opinion prepared for PCT/US2018/024743, completed May 15, 2018.
(Continued)

*Primary Examiner* — Brittany L Raymond
(74) *Attorney, Agent, or Firm* — Barnes & Thornburg LLP

(57) ABSTRACT

A formed substrate assembly includes an air flow form plate, a fuel flow form plate, and an anode. The fuel flow form plate is positioned over the air flow form plate. The fuel flow form plate partially defines a plurality of first channels. The fuel flow form plate also defines a plurality of second channels. The plurality of second channels defines a plurality of apertures, where a portion of the apertures extend from the plurality of second channels to the plurality of first channels. The anode is positioned over the fuel flow form plate. The anode partially defines the plurality of first channels such that the fuel flow form plate and the anode define the plurality of first channels. The portion of the plurality of apertures is configured to channel a flow of fuel
(Continued)

from the plurality of second channels to the plurality of first channels.

20 Claims, 5 Drawing Sheets

(51) Int. Cl.
    *H01M 8/04089*    (2016.01)
    *H01M 8/2425*     (2016.01)
    *H01M 8/2483*     (2016.01)
    *H01M 8/0254*     (2016.01)
    *H01M 8/026*      (2016.01)
    *H01M 8/0637*     (2016.01)
    *H01M 8/124*      (2016.01)

(52) U.S. Cl.
    CPC ... *H01M 8/04014* (2013.01); *H01M 8/04089* (2013.01); *H01M 8/2425* (2013.01); *H01M 8/2483* (2016.02); *H01M 8/0637* (2013.01); *H01M 2008/1293* (2013.01); *Y02E 60/50* (2013.01)

(58) Field of Classification Search
    CPC ............. H01M 8/2425; H01M 8/2483; H01M 2008/1293; Y02E 60/50
    See application file for complete search history.

(56) References Cited

U.S. PATENT DOCUMENTS

| | | |
|---|---|---|
| 7,056,611 B2 | 6/2006 | Fabis et al. |
| 7,553,568 B2 | 6/2009 | Keefer |
| 8,053,139 B2 | 11/2011 | Jiang et al. |
| 2006/0204796 A1 | 9/2006 | Potnis |
| 2007/0287047 A1 | 12/2007 | Kaiser et al. |
| 2008/0063907 A1 | 3/2008 | Takahashi et al. |
| 2013/0149633 A1 | 6/2013 | Jeong |
| 2018/0115011 A1 | 4/2018 | Brown et al. |

FOREIGN PATENT DOCUMENTS

| | | |
|---|---|---|
| DE | 102007035830 | 2/2009 |
| JP | 2010080155 A | 4/2010 |
| WO | WO2009/015712 | 2/2009 |

OTHER PUBLICATIONS

Chang et al., "Simulations of SOFC on electrochemical performance", 2010 International Symposium on Computer, Communication, Control and Automation (3CA), vol. 2, pp. 1-4, May 5-7, 2010, Tainan.

* cited by examiner

SYSTEM AND METHOD FOR SOLID OXIDE FUEL CELLS WITH STAGED FUEL SUPPLY

CROSS REFERENCE TO RELATED APPLICATIONS

This application is a U.S. national stage application under 35 U.S.C. § 371(b) of International Application No. PCT/US2018/024743, filed Mar. 28, 2018, which claims priority under 35 U.S.C. § 119(e) to U.S. patent application Ser. No. 15/471,716 filed 28 Mar. 2017, both of which are incorporated herein by reference in their entirety.

BACKGROUND

The field of the disclosure relates generally to fuel cell modules and, more particularly, to solid oxide fuel cell modules including staged fuel supply and methods of operation thereof.

Fuel cells convert the chemical energy from a fuel into electricity. They function by electrochemically combining the fuel with an oxidant across an ionic conducting layer. Usually, fuel cells require a continuous source of fuel and oxygen (or air), to sustain the chemical reaction. The fuel is most often hydrogen or a hydrogen-containing composition such as methanol, methane, or natural gas. There are many types of fuel cells, but they all include an anode, a cathode, and an electrolyte that allows ions to move between the two sides of the cell. The anode and cathode contain catalysts that cause the fuel to undergo oxidation reactions that generate ions and electrons. In solid oxide fuel cells, oxygen ions are drawn through the electrolyte from the cathode to the anode. At the same time, electrons are drawn from the anode to the cathode through an external circuit, producing electricity.

A typical fuel cell operates at a potential of less than about one (1) Volt. To achieve sufficient voltages for power generation applications, a number of individual fuel cells are integrated into a larger component, i.e., a fuel cell stack. To create a fuel stack, an interconnecting member or "interconnect" is used to connect the adjacent fuel cells together in an electrical series, in such a way that the fuel and oxidants of the adjacent cells do not mix together. A fuel cell stack may consist of hundreds of fuel cells. The amount of power produced by a fuel cell depends upon several factors, such as fuel cell type, cell size, the temperature at which it operates, and the pressure of the gases supplied to the cell. Certain fuel cells, such as solid oxide fuel cells (SOFCs), operate in large-scale power systems that provide electricity to satisfy industrial and municipal needs.

A typical SOFC with internal reforming operates with a large temperature gradient across the cell. However, the electrochemical reactions which power the cell have an optimum temperature which increases the efficiency of the cell. The electrochemical reactions include a reformation reaction that is endothermic and a fuel cell reaction that is exothermic. The fuel cell reaction increases the temperature of the fuel cell unit and the reformation reaction reduces the temperature of the fuel cell unit. The reformation reaction typically is catalyzed at an inlet of the fuel channels while the fuel cell reaction typically is catalyzed along the length of the fuel channels. Thus, the fuel cell unit typically has a cool region at the inlet of the fuel channels and a hot region in the middle or end of the fuel channels. The hot regions typically generate more current than the cool regions, but also experience faster degradation. The uneven temperature distribution throughout the SOFC is caused by the reforming, and fuel cell reactions lead to a non-optimal current distribution and lifespan.

With these concerns in mind, new processes for providing an even temperature gradient across the cell would be welcome in the art. The processes should be able to mechanically provide an even temperature gradient across the cell. The processes should also avoid reducing the power output of the cell. Moreover, it would also be very beneficial if the processes could be implemented with the existing cell structure rather than adding additional components or control procedures.

BRIEF DESCRIPTION

In one aspect, a formed substrate assembly for use in a fuel cell module is provided. The formed substrate assembly includes an air flow form plate, a fuel flow form plate, and an anode. The fuel flow form plate is positioned over the air flow form plate and has a first end and a second end. The fuel flow form plate partially defines a plurality of first channels extending from the first end to the second end. The fuel flow form plate also defines a plurality of second channels extending from the first end to the second end. The plurality of second channels defines a plurality of apertures, where a portion of the apertures extend from the plurality of second channels to the plurality of first channels. The anode is positioned over the fuel flow form plate. The anode partially defines the plurality of first channels such that the fuel flow form plate and the anode define the plurality of first channels. The portion of the plurality of apertures is configured to channel a flow of fuel from the plurality of second channels to the plurality of first channels.

In another aspect, a fuel cell module is provided. The fuel cell module includes a plurality of formed substrate assemblies stacked on each other. Each formed substrate assembly of said plurality of formed substrate assemblies includes an air flow form plate, a fuel flow form plate, and an anode. The fuel flow form plate is positioned over the air flow form plate and has a first end and a second end. The fuel flow form plate partially defines a plurality of first channels extending from the first end to the second end. The fuel flow form plate also defines a plurality of second channels extending from the first end to the second end. The plurality of second channels defines a plurality of apertures, where a portion of the apertures extend from the plurality of second channels to the plurality of first channels. The anode is positioned over the fuel flow form plate. The anode partially defines the plurality of first channels such that the fuel flow form plate and the anode define the plurality of first channels. The portion of the plurality of apertures is configured to channel a flow of fuel from the plurality of second channels to the plurality of first channels.

In yet another aspect, a method of channeling fluid through a fuel cell unit is provided. The method includes channeling a fluid to the fuel cell unit. The fuel cell unit includes an air flow form plate, a fuel flow form plate, and an anode. The fuel flow form plate is positioned over the air flow form plate. The anode is positioned over the fuel flow form plate. The anode and the fuel flow form plate define a plurality of first channels extending from a first end of the fuel flow form plate to a second end of the fuel flow form plate. The fuel flow form plate defines a plurality of second channels extending from the first end to the second end. The plurality of second channels defines a plurality of apertures, a portion of the apertures extending from the plurality of second channels to the plurality of first channels. The method also includes channeling a first portion of the fluid to the plurality of first channels. The method further includes channeling the first portion of the fluid to the anode. The method also includes channeling a second portion of the fluid to the plurality of second channels. The method further includes channeling the second portion of the fluid to the portion of the plurality of apertures and into the plurality of first channels. The method also includes channeling the second portion of the fluid to the anode.

In still another aspect, a formed substrate assembly for use in a fuel cell module is provided. The formed substrate assembly includes an air flow form plate, a fuel flow form plate, and an anode. The fuel flow form plate is positioned over the air flow form plate. The fuel flow form plate partially defines a plurality of first channels. The fuel flow form plate and the air flow form plate define a plurality of second channels. The plurality of second channels defines a plurality of apertures. The portion of the plurality of apertures extend from the plurality of second channels to the plurality of first channels. The portion of the plurality of apertures is configured to channel a flow of fuel from the plurality of second channels to the plurality of first channels. The anode is positioned over the fuel flow form plate. The fuel flow form plate and the anode define the plurality of first channels. The anode is configured to catalyze an endothermic reaction. The portion of the plurality of apertures is configured to cool a region of the formed substrate assembly by channeling the flow of fuel to the region where the anode catalyzes the endothermic reaction.

DRAWINGS

These and other features, aspects, and advantages of the present disclosure will become better understood when the following detailed description is read with reference to the accompanying drawings in which like characters represent like parts throughout the drawings, wherein.

Figure 1:
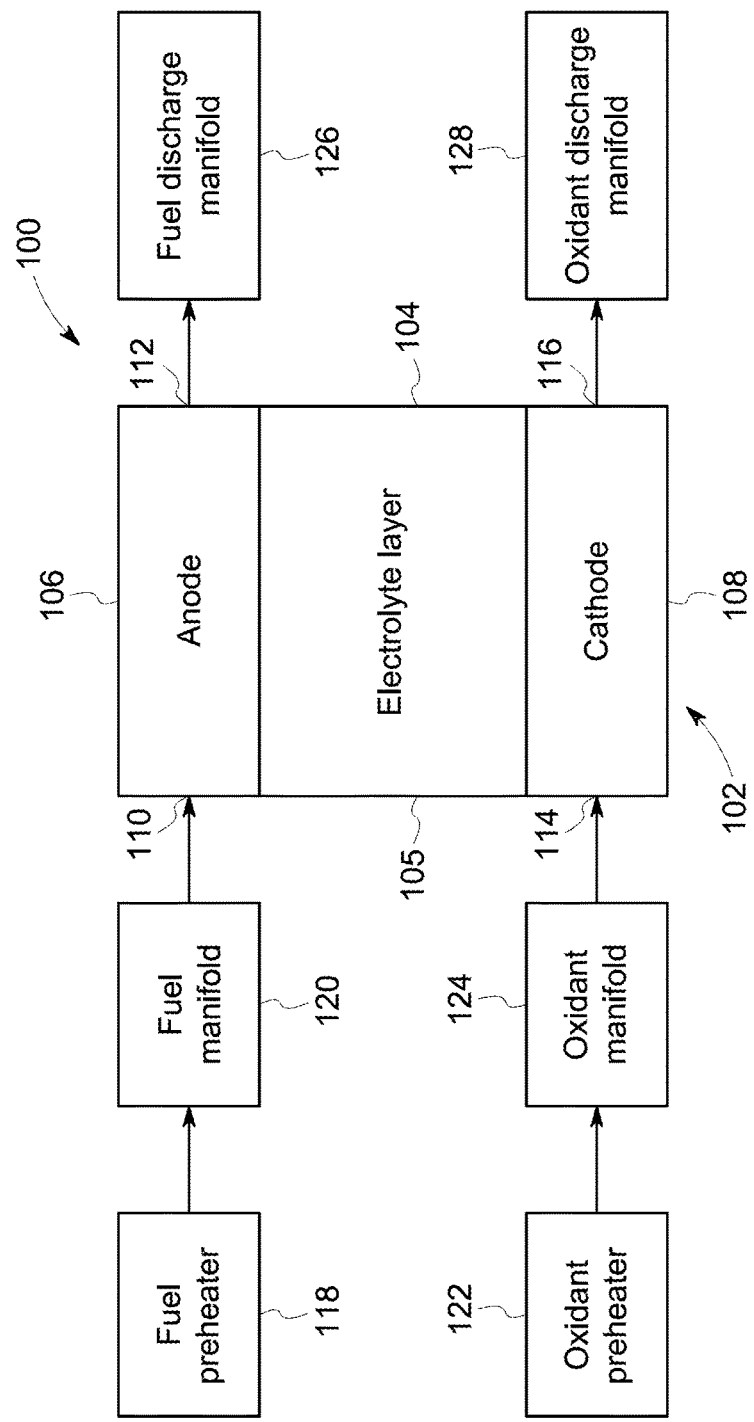
FIG. 1 is a schematic diagram of an exemplary fuel cell power generation system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Various types of fuel cells can be used for embodiments of this disclosure. Examples include solid oxide fuel cells (SOFC's) and molten carbonate fuel cells (MCFC's). The fuel cell generates direct current (DC) electric power by electrochemically combining a fuel and an oxidant across an ionic conducting layer. The ionic conducting layer, i.e., an electrolyte, is a liquid or solid. In some embodiments, the fuel cell is positioned in electrical series in an assembly of cells, to produce power at useful voltages or currents. While many fuel cells fall within the scope of these inventive embodiments, the disclosure will emphasize details regarding SOFC devices, which are preferred for many end use applications.

In an exemplary embodiment, the fuel cell includes the electrolyte, an anode, and a cathode. The electrochemical reactions that produce DC electricity generally take place at the anode and the cathode, where a catalyst is often employed to accelerate the reactions. The anode and the cathode typically include various channels and porous layers, to increase the surface area for the chemical reactions to occur. The electrolyte carries electrically charged particles from one of the anode and cathode to the other, and is otherwise substantially impermeable to both fuel and oxidant. The anode usually includes an inlet and an outlet to facilitate fuel flow therethrough, and the cathode may contain similar passageways for oxygen or air flow. According to a typical mechanism, the anode discharges a tail gas stream from the anode outlet that includes water, hydrogen, carbon monoxide (CO), carbon dioxide ($CO_2$), and unreacted fuel, if any.

As will be further described below, the fuel cell described herein e.g., the SOFC device, is often a component of a power generation system. The system includes at least one SOFC stack; and multiple stacks are often distributed in two or more modules. A variety of power generation systems having an SOFC stack connected to any type of power block (such as a gas turbine, steam turbine, combustion engine, or additional fuel cell) fall within the scope of this disclosure.

The fuel cell stacks mentioned above include a multitude of formed substrate assemblies, in vertical alignment with each other. An interconnect is used to connect the adjacent fuel cells together in electrical series. As is known in the art, each fuel cell may be only a few millimeters thick. Several hundred of them can be connected in series to form the fuel cell stack.

The formed substrate assemblies described herein include an air flow form plate, a fuel flow form plate, a cathode, and an anode. The fuel flow form plate is positioned over the air flow form plate. The anode is positioned on top of the fuel flow form plate and the cathode is positioned on top of the anode. An electrolyte is disposed between the cathode and the anode. The fuel flow form plate includes a plurality of fuel channels and a plurality of staggered fuel channels both configured to channel a flow of fuel. The fuel channels are partially defined by the anode while the staggered fuel channels are not partially defined by the anode. As such, the flow of fuel in the fuel channels is exposed to the anode along the entire length of the fuel channels. The plurality of staggered fuel channels include a plurality of apertures that extend from the staggered fuel channels to the fuel channels. The staggered fuel channels channel the flow of fuel past the inlet of the fuel channels to the apertures. The apertures channel the flow of fuel into the fuel channels where the endothermic reformation reaction cools down the hot region in the middle of the fuel cell unit. Cooling down the fuel cell unit below a predetermined temperature increases the life span of the fuel cell unit. Additionally, staggering the flow of fuel to other regions of the fuel cell unit also staggers where the reformation reactions and the electrochemical reactions take place within the fuel cell unit. As such, the electrochemical reactions are forced occur along the length of the fuel cell unit, increasing the current density and the overall efficiency of the fuel cell unit.

FIG. 1 is a schematic view of an exemplary fuel cell power generation system 100 that includes a fuel cell system 102. In the exemplary embodiment, fuel cell system 102 includes at least one fuel cell 104. Alternatively, fuel cell system 102 includes any number of fuel cells that enable fuel cell power generation system 100 to function as described herein. In the exemplary embodiment, fuel cell 104 is a solid oxide fuel cell (SOFC) device and includes one or more fuel cell stacks, as discussed further herein. Fuel cell 104 generates direct current (DC) electric power by electrochemically combining a fuel and an oxidant (both discussed further below) across an ionic conducting layer, i.e., an electrolyte layer 105. In the exemplary embodiment, the ionic conducting layer, or electrolyte layer 105 of fuel cell 104 is a solid. In embodiments with more than one fuel cell 104, the multiple fuel cells 104 are connected in electrical series in fuel cell system 102 to produce electrical power at useful voltages or currents.

In the exemplary embodiment, fuel cell 104 includes electrolyte layer 105, an anode 106, and a cathode 108. The electrochemical reactions that produce DC electricity generally take place at anode 106 and cathode 108 where a catalyst (not shown) is disposed to speed the reactions. Anode 106 and cathode 108 include channels and porous layers (neither shown in FIG. 1) to increase the surface area for the chemical reactions to occur. The electrolyte carries electrically charged particles from one of anode 106 and cathode 108 to the other and is otherwise substantially impermeable to both fuel and oxidant. To facilitate fuel flow through anode 106, anode 106 includes an inlet 110 and an outlet 112. Likewise, cathode 108 includes an inlet 114 and an outlet 116. Anode 106 discharges a tail gas stream from anode outlet 112 that includes water, hydrogen, carbon monoxide (CO), carbon dioxide ($CO_2$), and unreacted fuel, if any.

Fuel cell power generation system 100 also includes a fuel preheater 118 coupled to a fuel manifold 120. Fuel manifold 120 is coupled in flow communication with anode inlet 110 and fuel preheater 118. Fuel preheater 118 is coupled in flow communication with a carbonaceous, i.e., hydrocarbon fuel source (not shown) that, in the exemplary embodiment, channels natural gas to fuel manifold 120. Although natural gas is described herein, many other types of hydrogen-containing substances (e.g., hydrocarbon fuels) can be used with fuel cell power generation system 100 and fuel cell 104, as described herein. In the exemplary embodiment, fuel preheater 118 heats a flow of fuel and channels the heated flow of fuel to fuel manifold 120. Fuel manifold 120 channels the head flow of fuel to anode inlet 110.

Fuel cell power generation system 100 also includes an oxidant preheater 122 coupled to oxidant manifold 124 (broadly an air manifold). Oxidant manifold 124 is coupled in flow communication with cathode inlet 114 and oxidant preheater 122. Oxidant preheater 122 is coupled in flow communication with an oxidant, i.e., oxygen source (not shown) that, in the exemplary embodiment, channels air to oxidant manifold 124. In alternative embodiments, any oxidant is used that enables operation of fuel cell fuel cell power generation system 100 and fuel cell 104 as described herein. Oxidant preheater 122 heats a flow of oxidant and channels the heated flow of oxidant to oxidant manifold 124. Oxidant manifold 124 channels the heated flow of oxidant to cathode inlet 114.

In the exemplary embodiment, fuel cell power generation system 100 also includes a fuel discharge manifold 126 and an oxidant discharge manifold 128. Fuel discharge manifold 126 is coupled in flow communication with anode outlet 112 and oxidant discharge manifold 128 is coupled in flow communication with cathode outlet 116.

In alternative embodiments, fuel cell power generation system 100 includes any components coupled in any manner that enables fuel cell power generation system 100 to function as described herein. For example, in some embodiments, fuel cell power generation system 100 includes additional heat exchangers and/or fuel reformers. Additionally, in some embodiments, some components of fuel cell power generation system 100 are coupled in parallel and/or in series.

Figure 2:
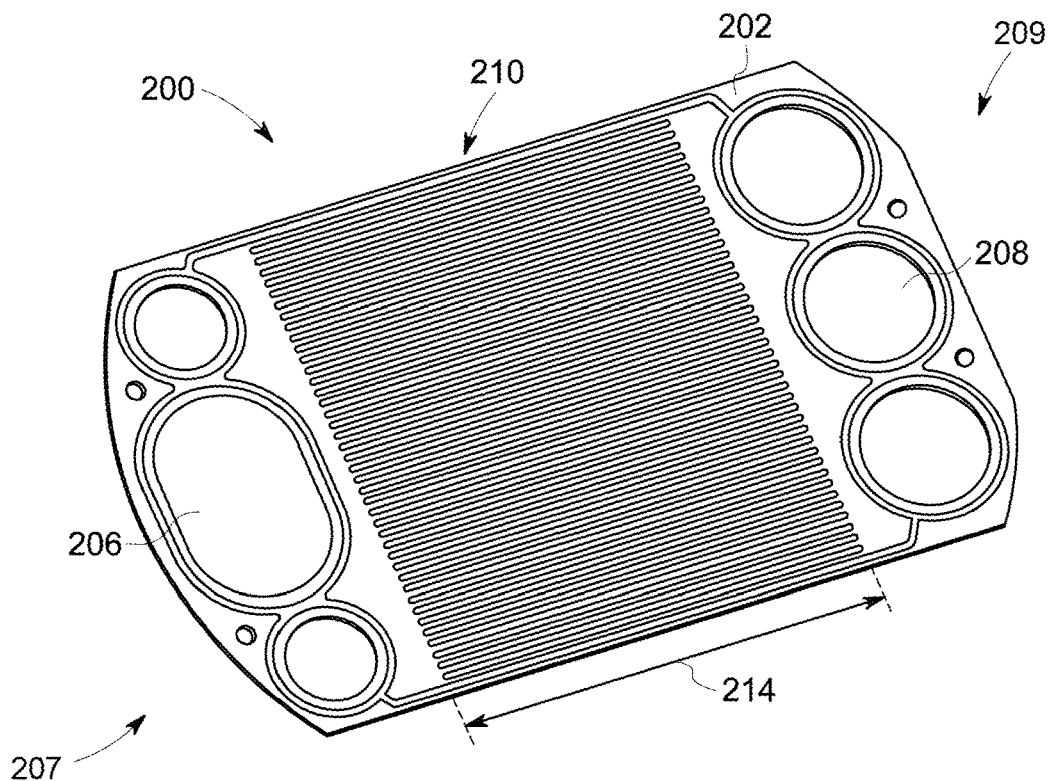
FIG. 2 is a perspective schematic view of a first side of a formed substrate assembly for use in a fuel cell of the fuel cell power generation system shown in FIG. 1.
Figure 3:
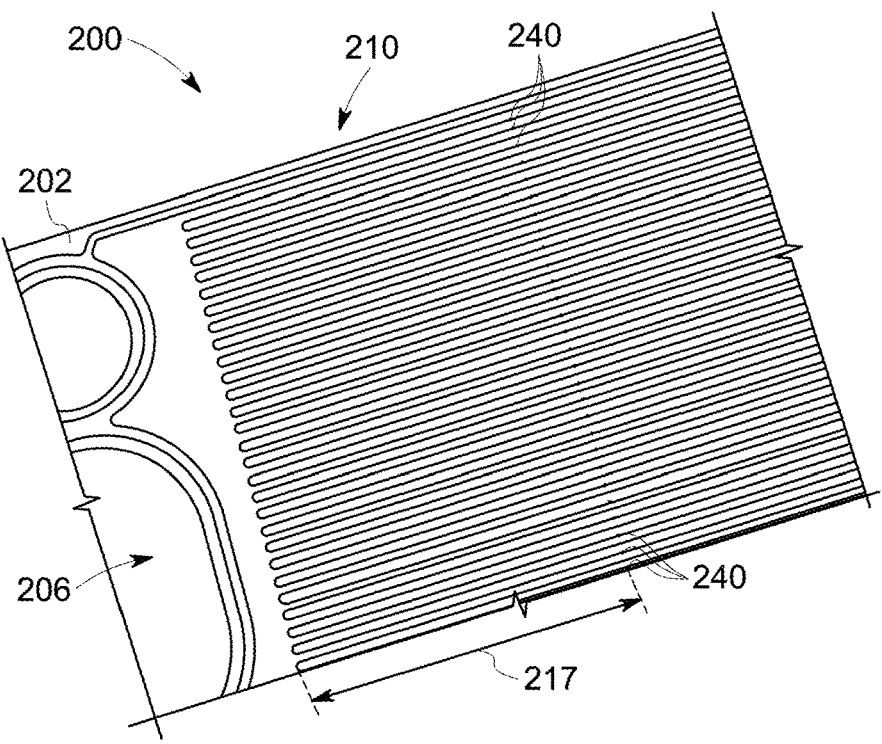
FIG. 3 is an enlarged view of FIG. 2 showing a plurality of apertures extending through the formed substrate assembly shown in FIG. 2.
Figure 4:
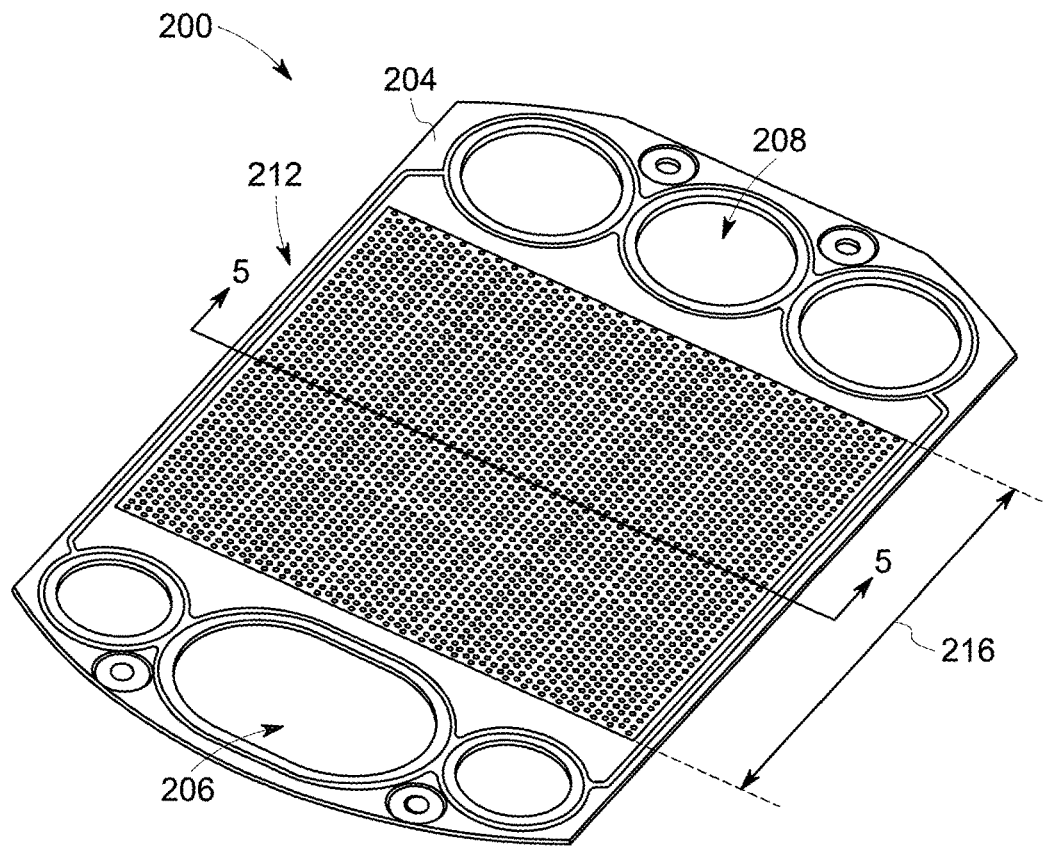
FIG. 4 is a perspective schematic view of a second side of the formed substrate assembly shown in FIG. 2.
Figure 5:
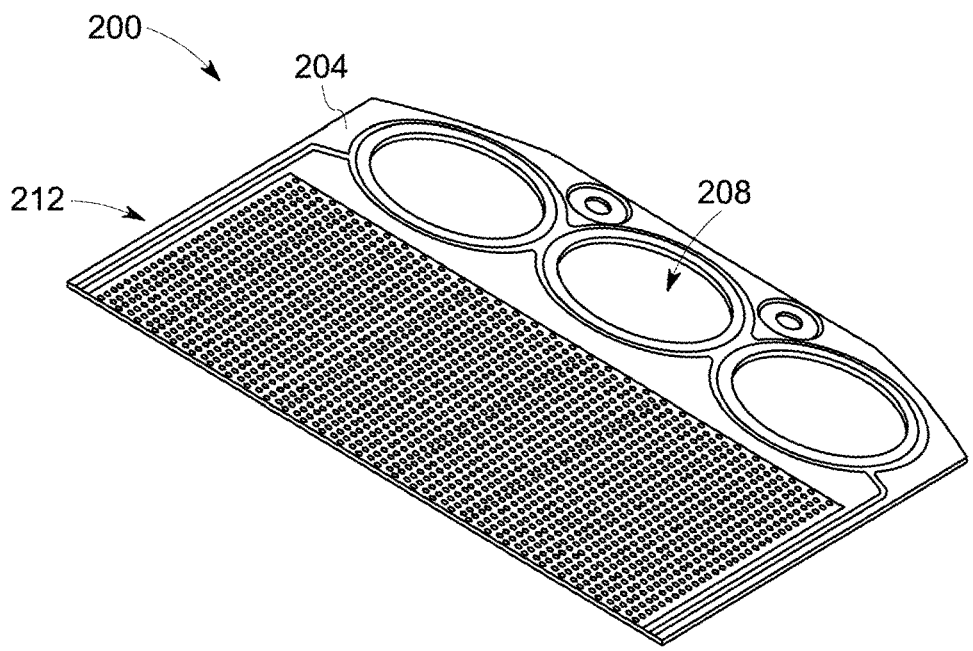
FIG. 5 is a perspective schematic sectional view of a portion of the formed substrate assembly shown in FIG. 4, taken along line 5-5.

FIG. 2 is a perspective schematic view of a first side 202 of a formed substrate assembly 200 for use in fuel cell 104 (shown in FIG. 1). FIG. 3 is an enlarged view of first side 202 of formed substrate assembly 200 showing a plurality of apertures 240 extending through formed substrate assembly 200. FIG. 4 is a perspective view of a second side 204 of formed substrate assembly 200. FIG. 5 is a perspective schematic sectional view of a portion of formed substrate assembly 200 taken along line 5-5 (shown in FIG. 4). Formed substrate assembly 200 includes an air inlet 206 at a first end 207 and a fuel inlet 208 at a second end 209. First side 202 includes a fuel and air flow section 210 and second side 204 includes a reaction section 212. Fuel and air flow section 210 has a fuel and air flow section length 214 and reaction section 212 has a reaction section length 216. Fuel cell 104 includes a plurality of stacked formed substrate assemblies 200. As shown in FIG. 3, plurality of apertures 240 are spaced a distance 217 along air flow section 210 from first end 207 (the air inlet 206 end) of formed substrate assembly 200.

Figure 6:
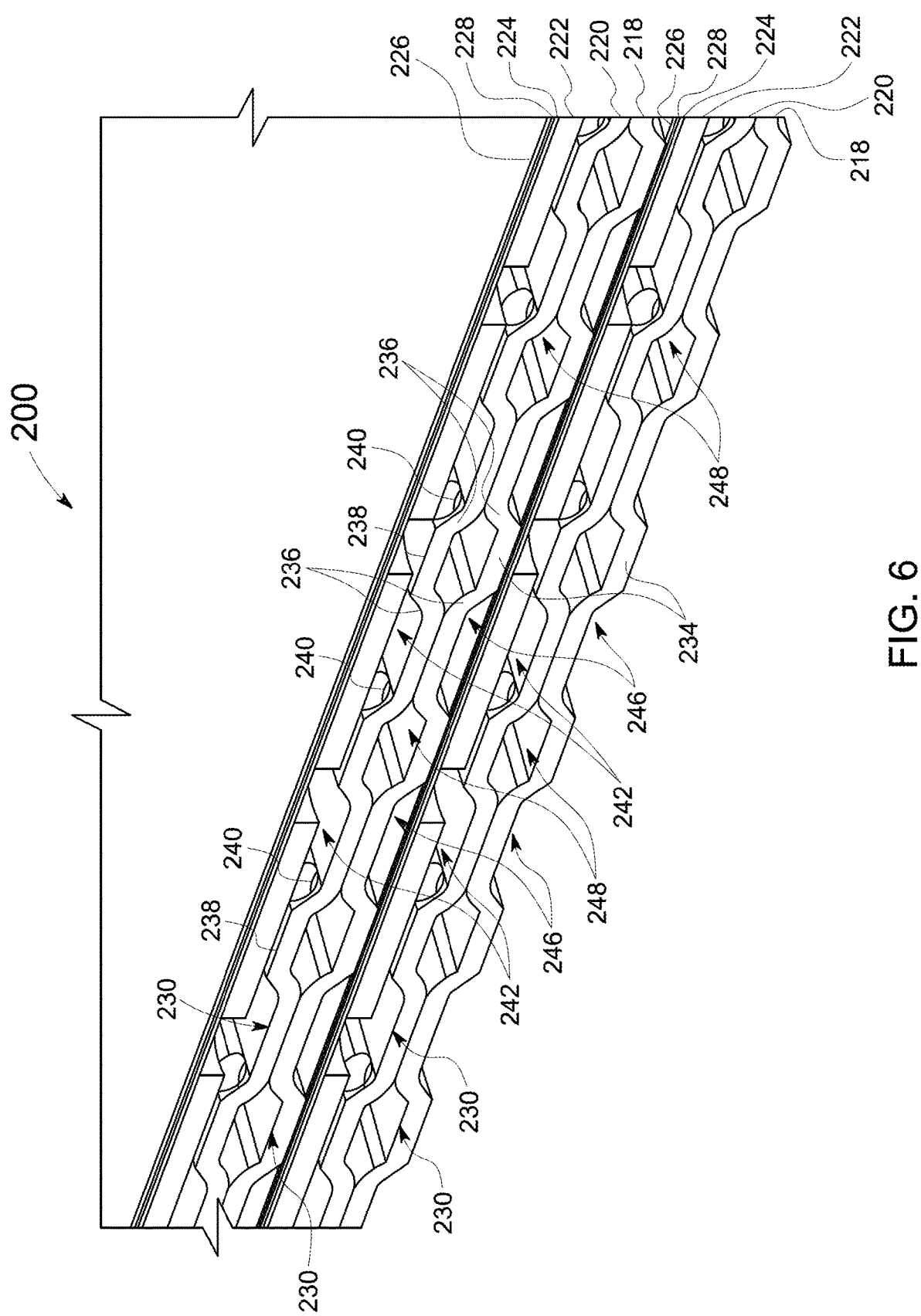
FIG. 6 is an enlarged perspective schematic sectional view of a portion of the formed substrate assembly shown in FIG. 5.
Figure 7:
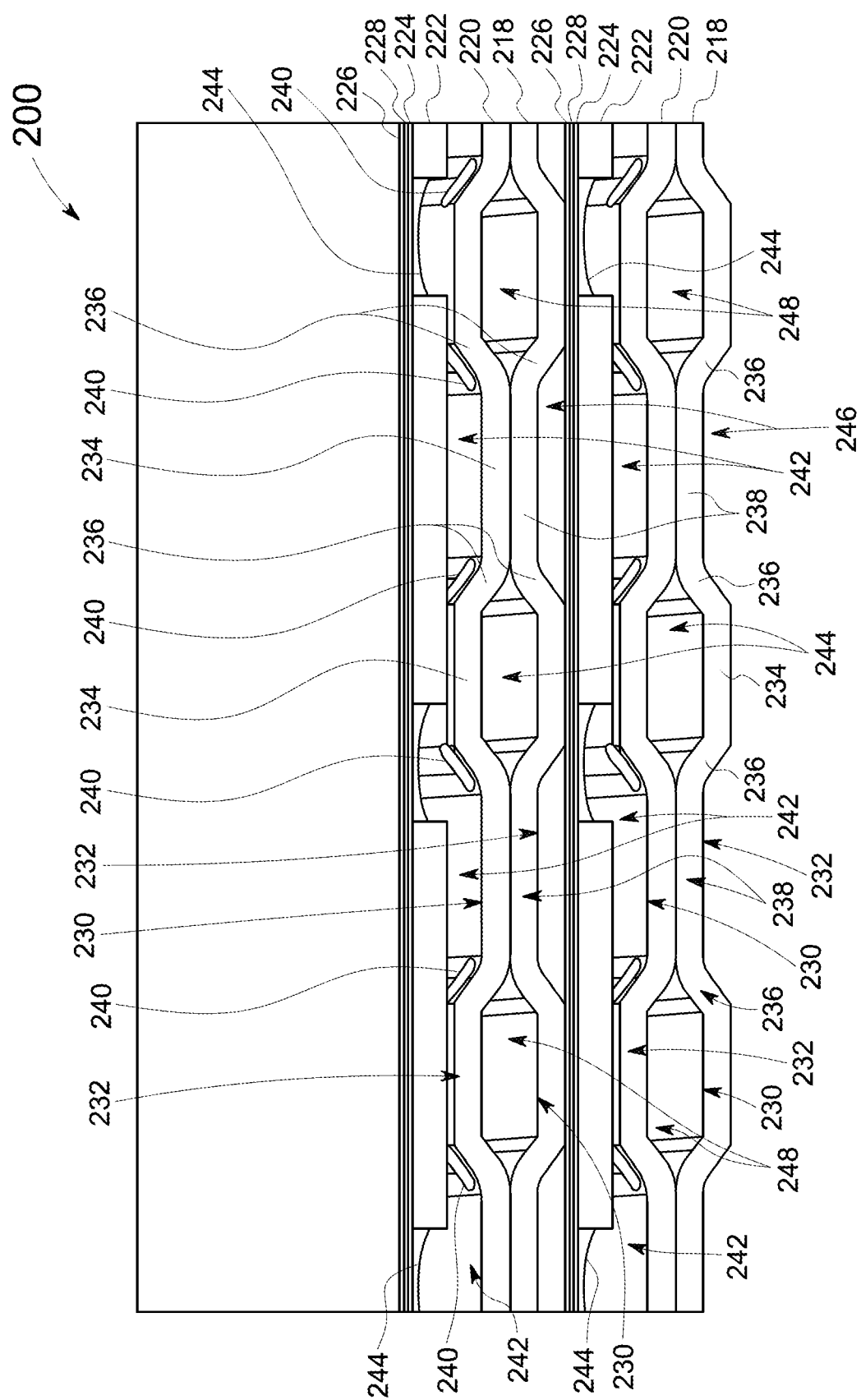
FIG. 7 is an end perspective schematic sectional view of the formed substrate assembly shown in FIG. 5.

FIG. 6 is an enlarged perspective schematic sectional view of a portion of formed substrate assembly 200. FIG. 7 is an end perspective schematic sectional view of formed substrate assembly 200 shown in FIG. 6. In the exemplary embodiment, formed substrate assembly 200 includes one or more stacked air flow form plates 218, fuel flow form plates 220, perforated plates 222, anodes 224, cathodes 226, and electrolyte layers 228. Fuel flow form plate 220 is positioned on top of air flow form plate 218 and perforated plate 222 is positioned on top of fuel flow form plate 220. Anode 224 is positioned on top of perforated plate 222 and electrolyte layer 228 is positioned on top of anode 224. Cathode 226 is positioned on top of electrolyte layer 228. Perforated plate 222 supports anode 224, cathode 226, and electrolyte layer 228. In the exemplary embodiment, electrolyte layer 228 includes, for example, and without limitation, a ceramic material including yttria-stabilized zirconia. In alternative embodiments, electrolyte layer 228 includes any material that enables formed substrate assembly 200 to operate as described herein.

Air flow form plate 218 and fuel flow form plate 220 both include a corrugated shape that forms a plurality of grooves 230 and a plurality of ridges 232. Each groove 230 and each ridge 232 extend along fuel and air flow section length 214 (shown in FIG. 2). In the exemplary embodiment, each groove 230 is defined by a base portion 234 and two side portions 236 coupled to base portion 234. Each ridge 232 is defined by a top portion 238 coupled on each side to a side portion 236 of groove 230.

In the exemplary embodiment, at least some of side portions 236 of fuel flow form plate 220 include the plurality of apertures 240 defined therethrough. As shown in FIG. 3, the plurality of apertures 240 are defined through at least some of side portions 236 at distance 217 along air flow section 210 from first end 207 (the air inlet 206 end) of formed substrate assembly 200. Distance 217 is a predetermined distance that corresponds to determined hot spots proximate a middle portion of formed substrate assembly 200. While the plurality of apertures 240 are shown at a single distance 217 in FIG. 3, it is contemplated that any number of apertures 240 can be formed at any number of predetermined distances along air flow section 210, such that apertures 240 are strategically placed corresponding to determined and/or expected hot spots in formed substrate assembly 200.

For example, and without limitation, in one embodiment, apertures 240 are not uniformly distributed along section length 214. For example, and without limitation, a number of apertures 240 and a spacing between apertures 240 may increase along section length 214, such that a concentration apertures 240 increases in a second half portion of section length 214. In addition or alternatively, apertures 240 may not be located in an end portion of section length 214 proximate air inlet 206 and/or fuel inlet 208 to facilitate preventing fuel from bypassing anode 244 altogether. In the exemplary embodiment, fuel flow form plate 220 is positioned over air flow form plate 218 such that each ridge 232 of air flow form plate 218 is coupled to a corresponding ridge 232 of fuel flow form plate 220. In the exemplary embodiment, air flow form plate 218 is bonded to fuel flow form plate 220. Placing apertures 240 along section length 214 as described above facilitates evening out a current density over the active area of fuel cell 104. In another embodiment, apertures 240 may also be defined through side portions 236 of air flow form plate 218 to facilitate increasing air flow in the vicinity of the hot spots, which facilitates improving heat transfer and reducing thermal gradients in fuel cell 104.

In the exemplary embodiment, grooves 230 of fuel flow form plate 220 and the perforated plate 222 define a plurality of primary fuel channels 242 (broadly, first channels) extending along fuel and air flow section length 214. Specifically, base portion 234, side portions 236, and perforated plate 222 define primary fuel channels 242. Primary fuel channels 242 are configured to channel a flow of fuel to anode 224 along fuel and air flow section length 214. Perforated plate 222 includes a plurality of perforated plate apertures 244 that channel a flow of fuel through perforated plate 222 to anode 224. Similarly, ridges 232 of air flow form plate 218 and cathode 226 define a plurality of oxidant channels 246 (broadly, third channels) extending along fuel and air flow section length 214. Specifically, top portion 238, side portions 236, and cathode 226 define oxidant channels 246. Oxidant channels 246 are configured to channel a flow of oxidant to cathode 226 along fuel and air flow section length 214. Fuel flow form plate 220 and air flow form plate 218 also define a plurality of staggered secondary channels 248 (broadly, second channels) extending along fuel and air flow section length 214. In the exemplary embodiment, staggered secondary channels 248 are configured to channel the flow of fuel to apertures 240. In some alternative embodiments, at least some of the staggered secondary channels 248 are configured to channel air flow to cathode 226.

During operation, oxidant manifold 124 (shown in FIG. 1) channels a flow of an oxidant through oxidant channels 246 and fuel manifold 120 channels a primary flow of fuel to primary fuel channels 242. Oxidant channels 246 channels the flow of oxidant to cathode 226 where a first electrochemical reaction occurs. In the exemplary embodiment, the flow of oxidant includes, for example oxygen from the air. In alternative embodiments, the flow of oxidant includes any oxidant that enables formed substrate assembly 200 to operate as described herein. In the exemplary embodiment, electrons are added to the oxygen molecules to create oxygen ions.

Primary fuel channels 242 channel the primary flow of fuel to anode 224 where a reformation reaction occurs. In the exemplary embodiment, the primary flow of fuel includes, for example, natural gas. In alternative embodiments, the primary flow of fuel includes any fuel that enables formed substrate assembly 200 to operate as described herein. In the exemplary embodiment, the primary flow of fuel also includes water. The catalyst in anode 224 catalyzes the reformation reaction between the water and the natural gas. Specifically, the natural gas and the water react to form hydrogen gas, carbon dioxide, and carbon monoxide. The reformation reaction is endothermic.

The second electrochemical reaction occurs at anode 224. The hydrogen gas from the reformation reaction is reacted with the oxygen ions from the first electrochemical reaction. Specifically, the oxygen ions from the first electrochemical reaction and the hydrogen gas from the reformation reaction react to form water and a flow of electrons. The electrons create an electric current through a wire (not shown). The wire returns the electrons to cathode 226 to complete the circuit and provide the electrons for the first electrochemical reaction. The combination of the first and second electrochemical reactions is exothermic.

The first and second electrochemical reactions occur along reaction section length 216 while the reformation reaction occurs at an inlet of primary fuel channels 242. Thus, the reformation reaction reduces a temperature of formed substrate assembly 200 at the inlet of primary fuel channels 242 while the first and second electrochemical reactions increase the temperature of formed substrate assembly 200 along reaction section length 216. However, the first and second electrochemical reactions do not occur uniformly along reaction section length 216 because more fuel is available for reaction at the inlet of primary fuel channels 242. Thus, the first and second electrochemical reactions occur non-uniformly along reaction section length 216, reducing the current density and efficiency of formed substrate assembly 200.

To facilitate reducing the temperature of formed substrate assembly 200 and increasing the current density and efficiency of formed substrate assembly 200, at least a portion of staggered secondary channels 248 channel a secondary flow of fuel to apertures 240. Apertures 240 channel a third flow of fuel to primary fuel channels 242. Natural gas within the third flow of fuel undergoes the reformation reaction in the area proximate to apertures 240 in primary fuel channels 242. Staggered secondary channels 248 and apertures 240 stagger the flow of fuel into primary fuel channels 242 such that the reformation reaction occurs at various locations along reaction section length 216. As previously discussed, the reformation reaction is endothermic and reduces the temperature of formed substrate assembly 200. Thus, staggering the flow of fuel to anode 224 reduces the temperature of formed substrate assembly 200 along reaction section length 216. Additionally, staggering the flow of fuel to anode 224 forces the reformation reaction and the first and second electrochemical reactions to occur along reaction section length 216. Thus, staggering the flow of fuel to anode 224 also increases the current density and efficiency of formed substrate assembly 200.

Formed substrate assembly 200 has a predetermined temperature where formed substrate assembly 200 operates at an enhanced efficiency. Staggering the flow of fuel to anode 224 reduces the temperature of formed substrate assembly 200 along reaction section length 216 below the predetermined temperature. Thus, staggering the flow of fuel to anode 224 increases the efficiency of formed substrate assembly 200. Additionally, reducing the temperature of formed substrate assembly 200 below the predetermined temperature increases the life span of formed substrate assembly 200.

In an alternative embodiment, the flow of oxidant to the cathode 226 is also staggered. For example, at least some staggered secondary channels 248 are configured to channel a flow of oxidant to oxidant channels 246 in a similar staggered manner rather than channeling a flow of fuel to primary fuel channels 242. In such an embodiment, at least some of side portions 236 of air flow form plate 218 include a plurality of apertures 240 defined therethrough. As with the plurality of apertures 240 defined through the fuel flow form plate 220, at least some of side portions 236 of the air flow form plate 218 includes apertures 240 at distance 217 along air flow section 210 from first end 207 (the air inlet 206 end) of formed substrate assembly 200. As described herein, distance 217 is a predetermined distance that corresponds to determined hot spots proximate a middle portion of formed substrate assembly 200. It is contemplated that any number of apertures 240 can be formed at any number of predetermined distances along air flow section 210, such that apertures 240 are strategically placed corresponding to determined and/or expected hot spots in formed substrate assembly 200. Staggering the flow of oxidant facilitates cooling the hot spots near the middle and outlet ends of the fuel cell. While staggering the flow of oxidant may not be as effective as staggering the flow of fuel because there is no endothermic reaction, as described herein, increasing the flow of oxidant in the vicinity of the hot spots facilitates improving heat transfer and reducing thermal gradients.

The above described fuel cell modules include a plurality of channels configured to stagger the flow of fuel to an anode and to increase the efficiency of the fuel cell module. In particular, the channels stagger the flow of fuel such that an endothermic reformation reaction occurs along the length of the fuel cell module. The endothermic reformation reaction reduces the temperature of the fuel cell module, increasing the efficiency of the fuel cell module. Reducing the temperature of the fuel cell module increases the life span of the fuel cell module. Additionally, staggering where the reformation reaction occurs staggers where the electrochemical reactions occur. Staggering where the electrochemical reactions occur increases the current density and the efficiency of the fuel cell.

An exemplary technical effect of the methods, systems, and apparatus described herein includes at least one of: (a) staggering the flow of fuel to the anode; (b) decreasing the temperature of a fuel cell module; (c) increasing the current density of the fuel cell module; (c) increasing the efficiency of the fuel cell module; and (d) increasing the life span of the fuel cell module.

Exemplary embodiments of fuel cell modules that include a plurality of channels configured to stagger the flow of fuel to an anode are described above in detail. The fuel cell modules, and methods of operating such systems and devices are not limited to the specific embodiments described herein, but rather, components of systems and/or steps of the methods may be utilized independently and separately from other components and/or steps described herein. For example, the methods may also be used in combination with other systems, and are not limited to practice with only the fuel cell modules, fuel cell systems, and methods as described herein. Rather, the exemplary embodiment can be implemented and utilized in connection with many other fuel cell applications that are currently configured to receive and accept fuel cells, e.g., and without limitation, distributed generation facilities in remote areas and industrial facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of channeling fluid through a formed substrate assembly, said method comprising:
channeling a fluid to the formed substrate assembly, the formed substrate assembly including an air flow form plate, a fuel flow form plate, an anode, and a cathode, the fuel flow form plate positioned over the air flow form plate, the anode positioned over the fuel flow form plate, the anode and the fuel flow form plate defining a plurality of first channels extending from a first end of the fuel flow form plate to a second end of the fuel flow form plate, the fuel flow form plate defining a plurality of second channels extending from said first end to said second end, the plurality of second channels defining a plurality of apertures, a portion of the plurality of apertures extending from the plurality of second channels to the plurality of first channels, the cathode positioned below said air flow form plate, the cathode and the air form plate defining a plurality of third channels extending from a first end of the air form plate to a second end of the air form plate, a second portion of said plurality of apertures extending from said plurality of second channels to said plurality of third channels, wherein said second portion of said plurality of apertures are configured to channel a flow of air from said plurality of second channels to said plurality of third channels;

channeling a first portion of the fluid to the plurality of first channels;

channeling the first portion of the fluid to the anode;

channeling a second portion of the fluid to a portion of the plurality of second channels;

channeling the second portion of the fluid to the portion of the plurality of apertures and into the plurality of first channels; and channeling the second portion of the fluid to the anode.

2. The method in accordance with claim 1, wherein channeling a fluid to the formed substrate assembly comprises channeling a fluid to a fuel manifold.

3. The method in accordance with claim 1, further comprising catalyzing a first reaction between the anode and the first portion of the fluid.

4. The method in accordance with claim 3, further comprising catalyzing a second reaction between the anode and the second portion of the fluid.

5. The method in accordance with claim 3, wherein the first reaction is an endothermic reaction.

6. The method in accordance with claim 3, wherein the first reaction is a reformation reaction.

7. The method in accordance with claim 1, further comprising channeling a flow of air to the formed substrate assembly.

8. The method in accordance with claim 1, further comprising an air manifold configured to channel the flow of air to said plurality of third channels and said second portion of said plurality of apertures.

9. The method in accordance with claim 1, further comprising catalyzing a first reaction between the anode and the first portion of the fluid and a second reaction between the anode and the second portion of the fluid.

10. The method in accordance with claim 9, wherein the first reaction is an endothermic reaction.

11. The method in accordance with claim 9, wherein the combination of the first reaction and the second reaction is an exothermic reaction.

12. The method in accordance with claim 9, wherein the first reaction is a reformation reaction.

13. The method in accordance with claim 1, wherein said plurality of apertures and said plurality of first channels are configured to maintain a temperature of said formed substrate assembly below a predetermined temperature.

14. The method in accordance with claim 1, further comprising staggering the flow of a fuel through the plurality of secondary channels to the anode.

15. The method in accordance with claim 1, further comprising staggering the flow of an oxidant through the plurality of secondary channels to the cathode.

16. The method in accordance with claim 15, wherein staggering the flow of an oxidant through the plurality of secondary channels to the cathode is not an endothermic reaction.

17. The method in accordance with claim 1, further comprising reducing the temperature of the formed substrate assembly below a predetermined temperature.

18. The method in accordance with claim 1, further comprising increasing the life span of the formed substrate assembly or a fuel cell module.

19. The method in accordance with claim 1, further comprising increasing the current density and efficiency of the formed substrate assembly or a fuel cell module.

20. The method in accordance with claim 1, further comprising reducing the temperature of a fuel cell module.

* * * * *